United States Patent
Cho et al.

(10) Patent No.: US 11,378,647 B2
(45) Date of Patent: Jul. 5, 2022

(54) METHOD AND DEVICE FOR ADAPTIVELY CONFIGURING THRESHOLD FOR OBJECT DETECTION BY MEANS OF RADAR

(71) Applicant: WRT LAB CO., LTD., Seoul (KR)

(72) Inventors: Sung Ho Cho, Seoul (KR); Xuanjun Quan, Seoul (KR); Jeong Woo Choi, Seoul (KR)

(73) Assignee: WRT LAB CO., LTD., Seoul (KR)

( * ) Notice: Subject to any disclaimer, the term of this patent is extended or adjusted under 35 U.S.C. 154(b) by 392 days.

(21) Appl. No.: 16/480,056

(22) PCT Filed: Jan. 26, 2018

(86) PCT No.: PCT/KR2018/001145
§ 371 (c)(1),
(2) Date: Jul. 23, 2019

(87) PCT Pub. No.: WO2018/139887
PCT Pub. Date: Aug. 2, 2018

(65) Prior Publication Data
US 2019/0377063 A1    Dec. 12, 2019

(30) Foreign Application Priority Data

Jan. 26, 2017  (KR) .................. 10-2017-0012876

(51) Int. Cl.
*G01S 7/292*  (2006.01)
*G01S 7/40*   (2006.01)
(Continued)

(52) U.S. Cl.
CPC .......... *G01S 7/2927* (2013.01); *G01S 7/4004* (2013.01); *G01S 7/415* (2013.01); *G01S 13/0209* (2013.01);
(Continued)

(58) Field of Classification Search
CPC ...... G01S 13/10; G01S 7/415; G01S 13/0209; G01S 13/522; G01S 13/50; G01S 7/2927; G01S 7/4004
See application file for complete search history.

(56) References Cited

U.S. PATENT DOCUMENTS

2012/0296562 A1* 11/2012 Carlson .................. G08G 1/161
                                                          701/301
2015/0077282 A1*  3/2015 Mohamadi ............ G01S 13/888
                                                          342/27
(Continued)

FOREIGN PATENT DOCUMENTS

JP    H04-064078 A    2/1992
JP     4541817 B2     9/2010
(Continued)

OTHER PUBLICATIONS

International Search Report issued in PCT/KR2018/001145, dated May 3, 2018.

*Primary Examiner* — Thomas M Hammond, III
(74) *Attorney, Agent, or Firm* — Locke Lord LLP; Scott D. Wofsy; Michael J. Pollack

(57) ABSTRACT

Disclosed are a method and a device for adaptively configuring a threshold for object detection by means of radar, the device including: a position-specific maximum signal value extraction unit extracting a maximum value of a signal for each position by obtaining the signal when there is no moving object; a position-specific signal magnitude sorting unit obtaining signals caused by a moving object, and sorting magnitudes of the obtained signals for each position in descending order for a time index; a candidate signal index selection unit selecting a candidate signal index; a signal index determination unit setting weighting factors for the respective signals up to the candidate signal index, and determining a sum of the weighting factors as a signal index;

(Continued)

and a position-specific threshold configuring unit configuring the threshold for each position by using a signal of the determined signal index and a scaling factor.

12 Claims, 8 Drawing Sheets

(51) Int. Cl.
*G01S 13/10* (2006.01)
*G01S 13/50* (2006.01)
*G01S 13/522* (2006.01)
*G01S 7/41* (2006.01)
*G01S 13/02* (2006.01)

(52) U.S. Cl.
CPC .............. *G01S 13/10* (2013.01); *G01S 13/50* (2013.01); *G01S 13/522* (2013.01)

(56) References Cited

U.S. PATENT DOCUMENTS

| | | | | |
|---|---|---|---|---|
| 2019/0178980 A1* | 6/2019 | Zhang | .................... | G01S 7/415 |
| 2020/0113484 A1* | 4/2020 | Schindhelm | ........... | G08B 21/02 |

FOREIGN PATENT DOCUMENTS

| | | |
|---|---|---|
| JP | 2012-048643 A | 3/2012 |
| JP | 5371273 B2 | 12/2013 |
| KR | 10-2003-0034170 A | 5/2003 |
| KR | 10-2014-0040422 A | 4/2014 |
| KR | 10-1417408 B1 | 7/2014 |
| KR | 10-2015-0063638 A | 6/2015 |
| KR | 10-2016-0135561 A | 11/2016 |

* cited by examiner

[FIG. 1]
[FIG. 2]
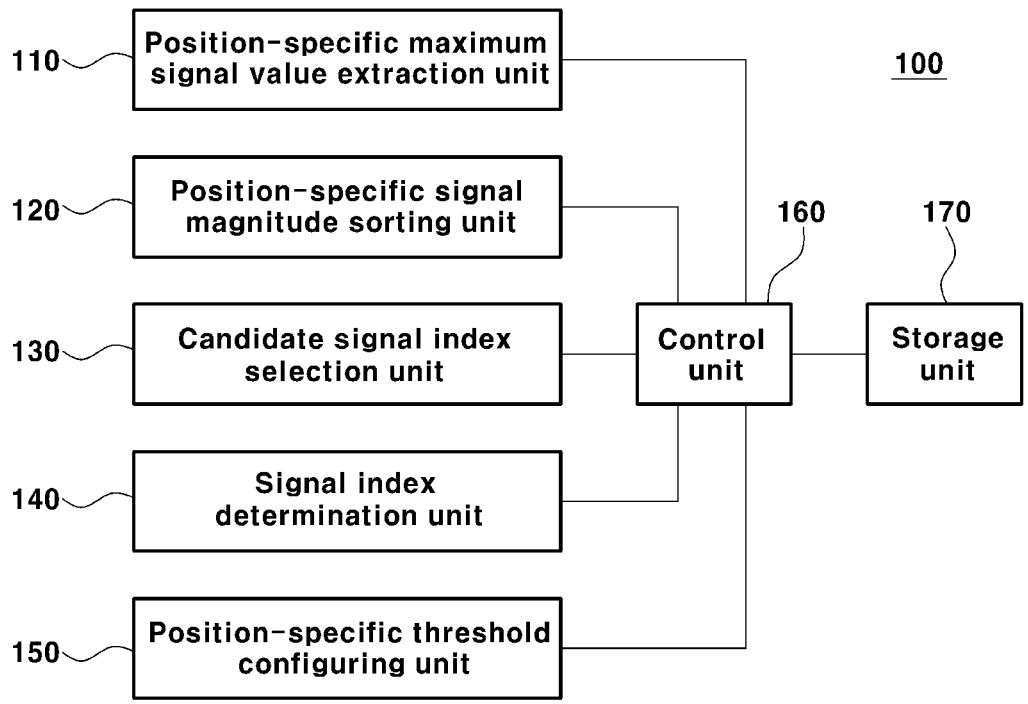

[FIG. 3]
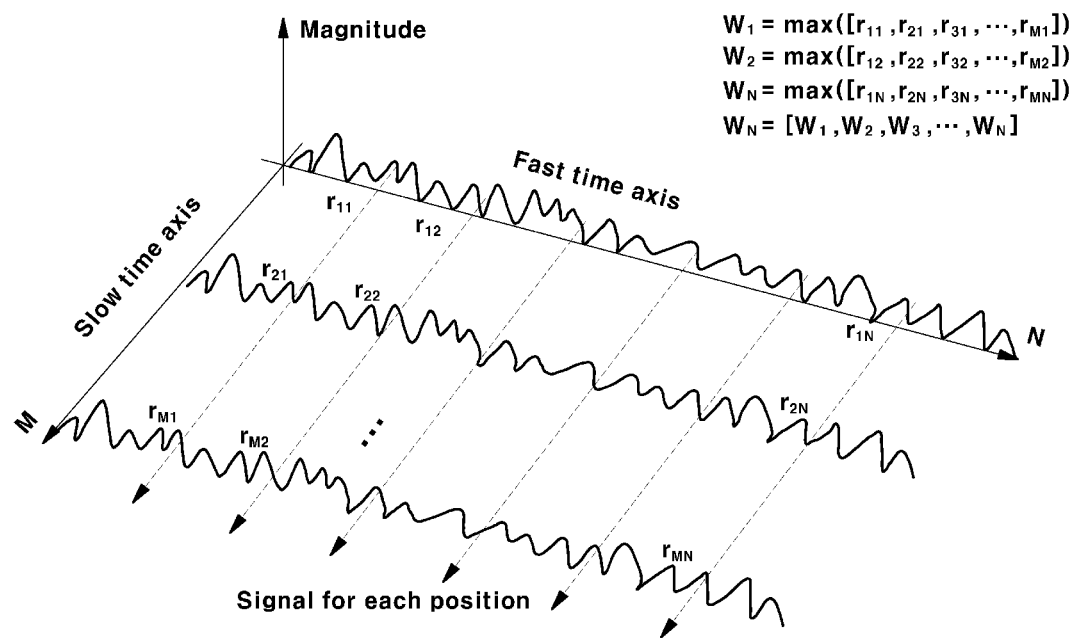

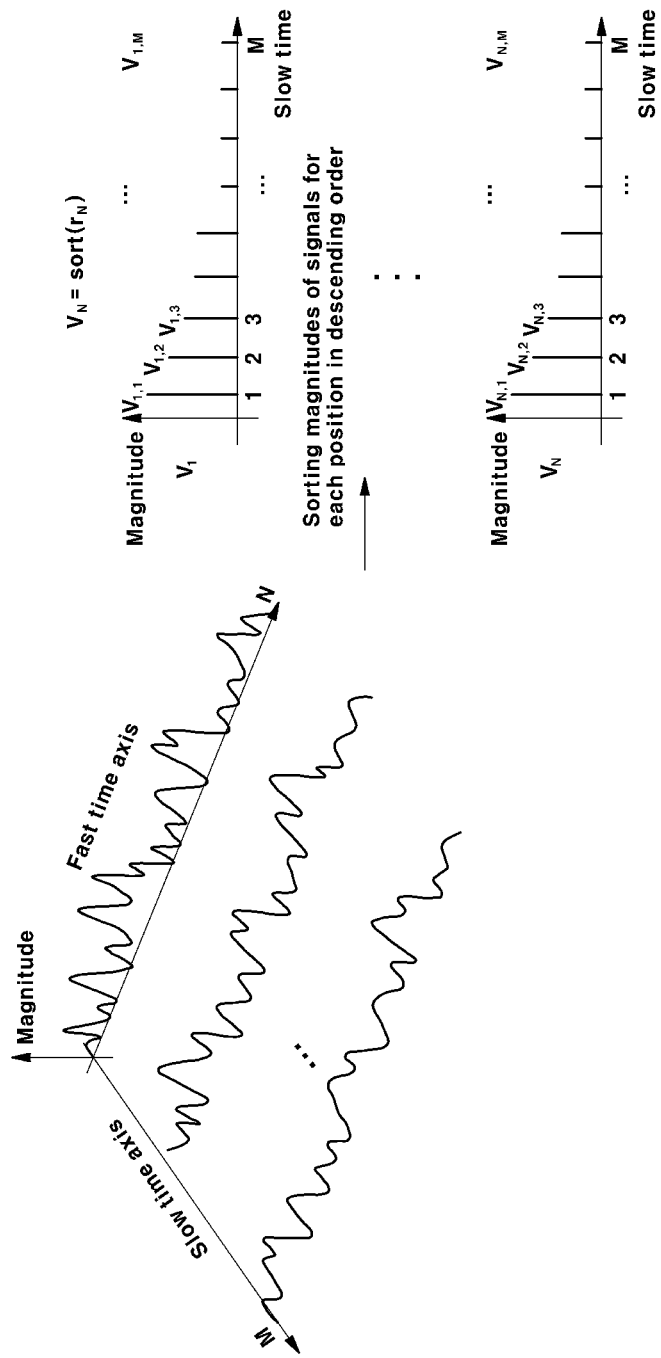
[FIG. 4]

[FIG. 5]
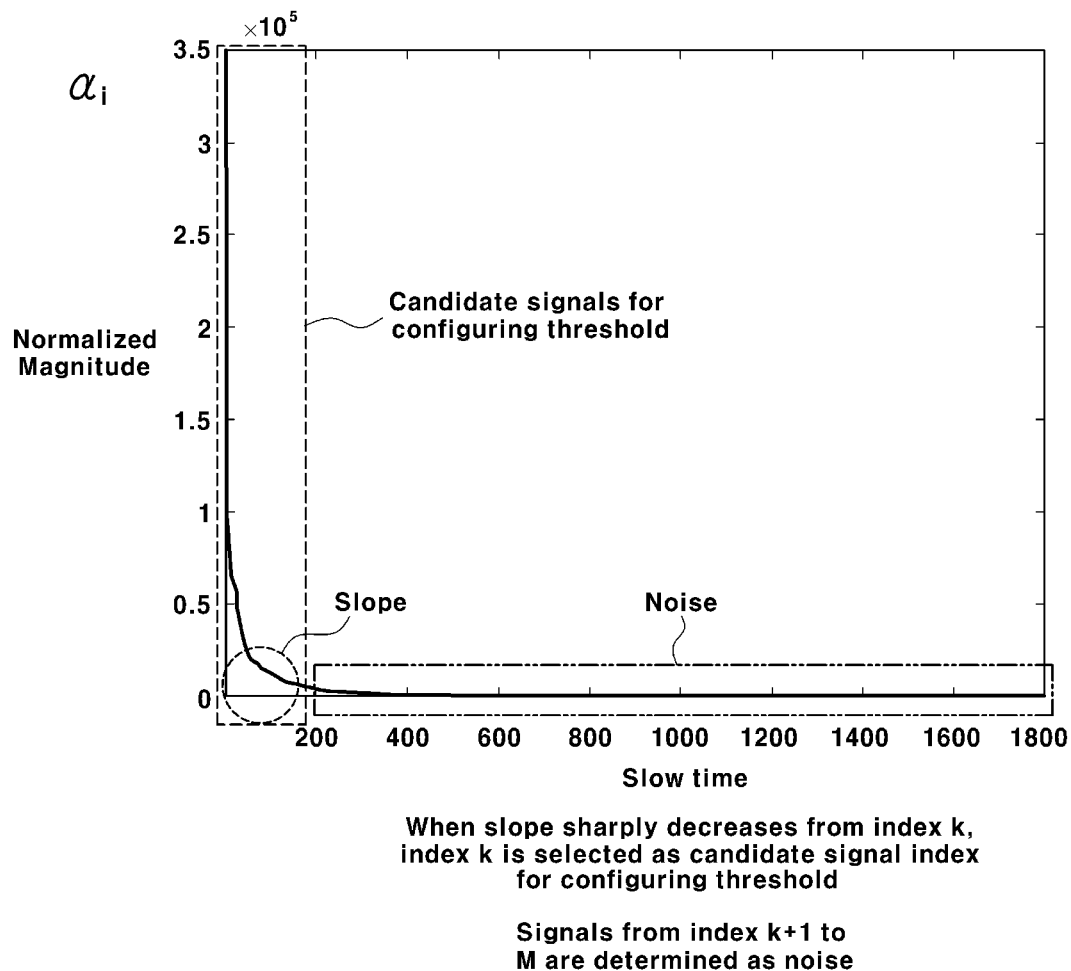

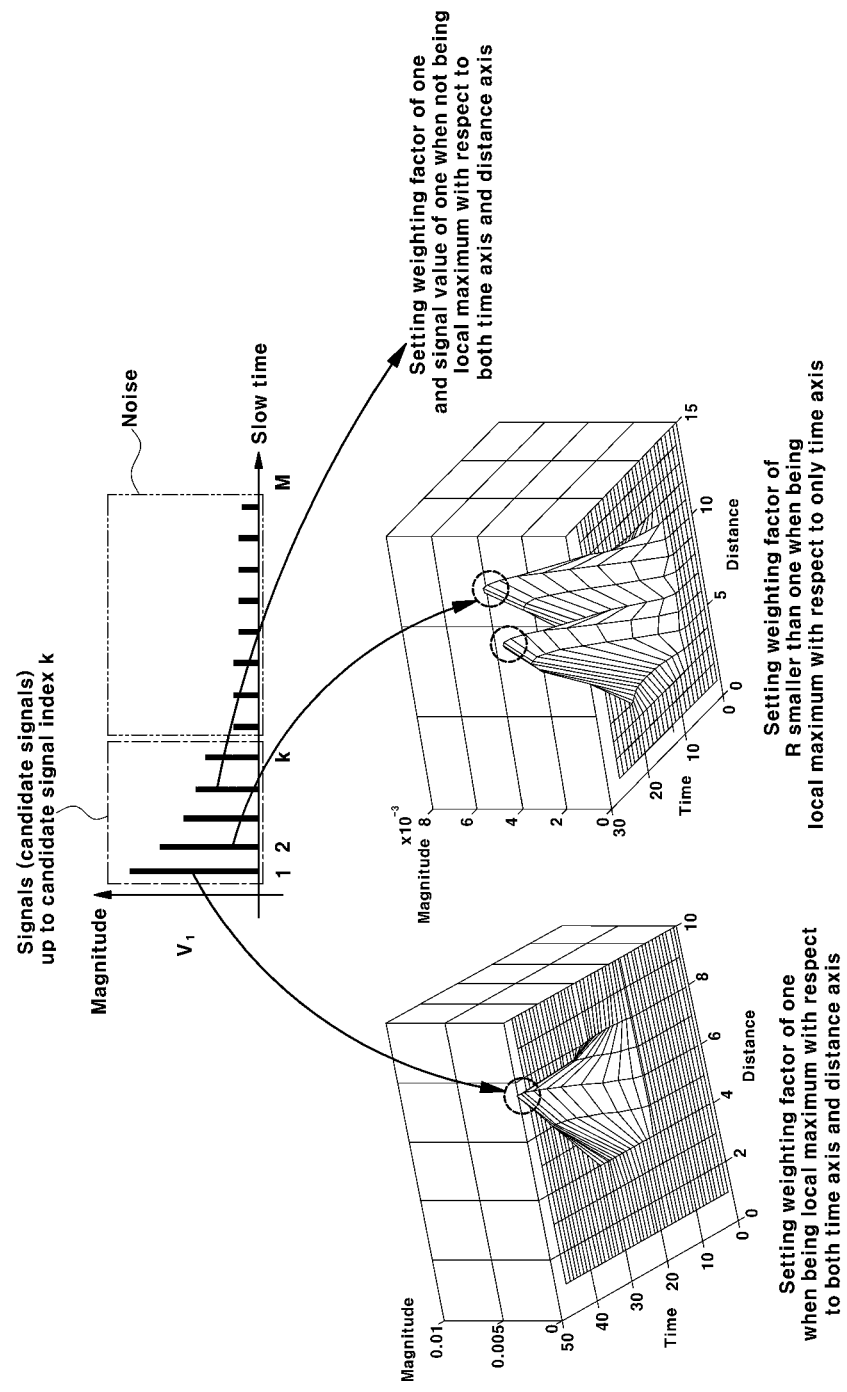
[FIG. 6]

[FIG. 7]
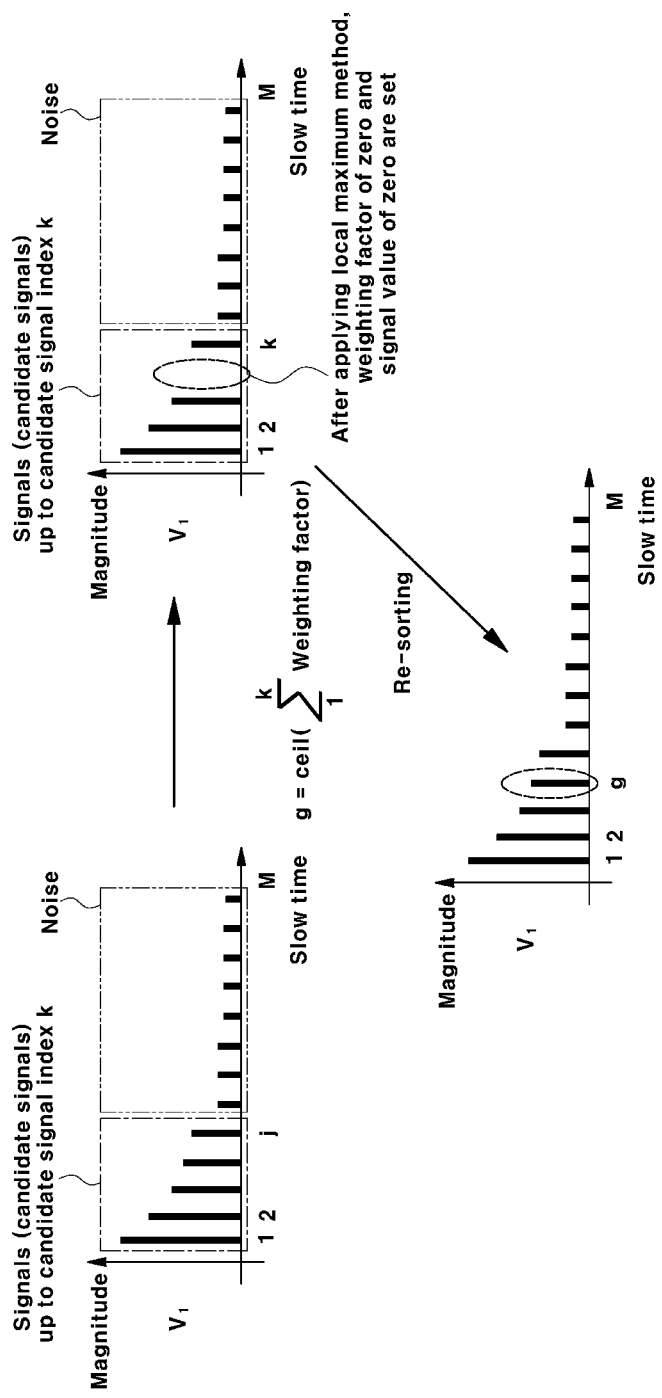

[FIG. 8]
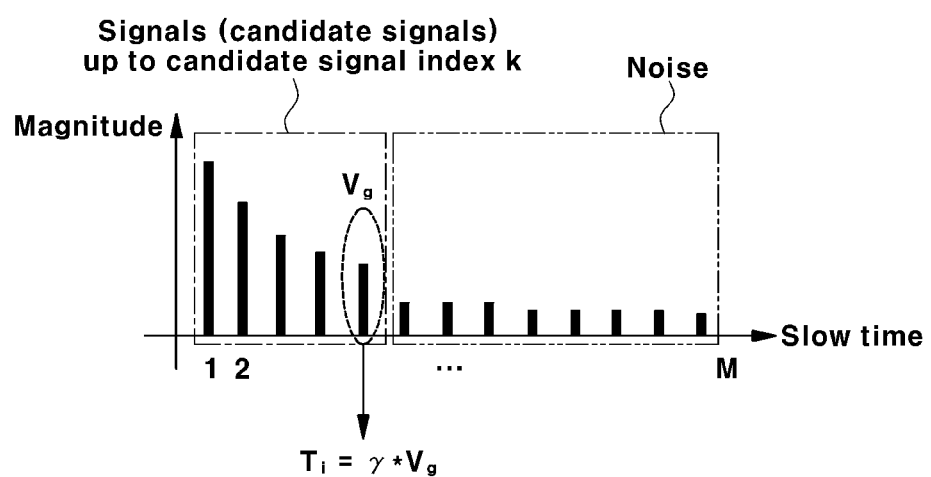

[FIG. 9]
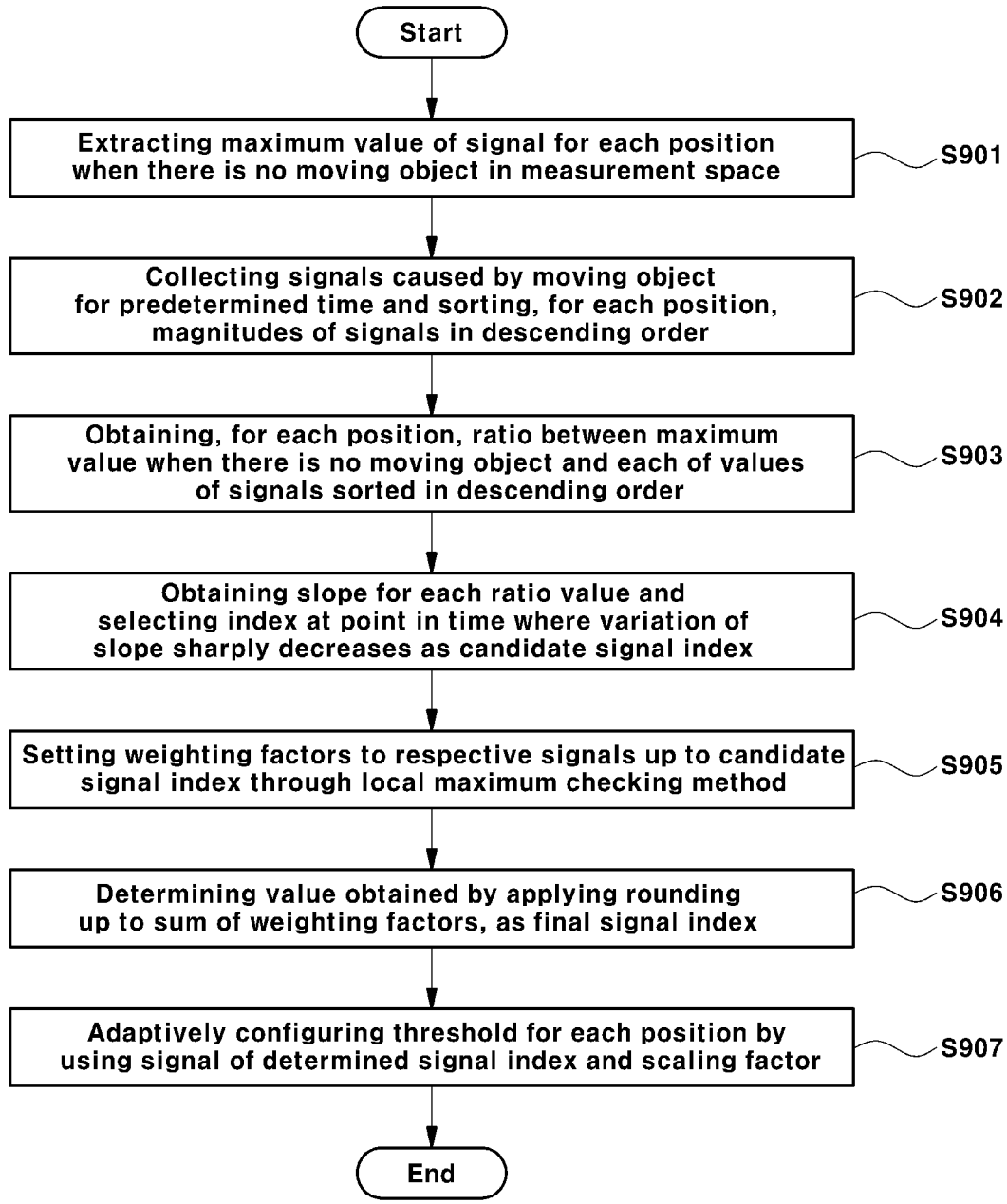

METHOD AND DEVICE FOR ADAPTIVELY CONFIGURING THRESHOLD FOR OBJECT DETECTION BY MEANS OF RADAR

CROSS REFERENCE TO RELATED APPLICATIONS

This application is a U.S. National Phase Application filed under 35 U.S.C. § 371, based on Application PCT/KR2018/001145, filed Jan. 26, 2018, which application claims priority to Korean Patent Application No. 10-2017-0012876 filed on Jan. 26, 2017. The entire contents of these applications are incorporated herein by reference in their entirety.

TECHNICAL FIELD

The present disclosure relates generally to a technology for detecting a moving object in a measurement space by using radar. More particularly, the present disclosure relates to a technology for adaptively configuring a threshold for determining a particular object as a moving object.

BACKGROUND ART

The expression "ultra-wide band (UWB)" means a radio technology in which a frequency band of 500 MHz or more is used or in which a value defined by a fractional band width that is a bandwidth of a signal compared to the center frequency is 25% or more.

That is, UWB is a radio technology using broadband frequencies and has various advantages such as high distance resolution, permeability, strong immunity against narrowband noise, and coexistence with other devices sharing a frequency.

An impulse-radio ultra-wide band (IR-UWB) radar (hereinafter, referred to as "UWB radar") technology is a technology in which a UWB technology is grafted on radar, and is a radar technology for recognizing a surrounding environment by transmitting an impulse signal having a short duration with a broadband characteristic in the frequency domain and by receiving a signal which reflects off an object and a person.

In a UWB radar system, a signal generation unit generates an impulse signal having a time width of several nanoseconds to several picoseconds and emits the impulse signal at a wide angle or a narrow angle through a transmission antenna, and the emitted signal reflects off various objects or people and is converted into a digital signal through a reception antenna and an ADC.

When such a UWB radar is used to detect a moving object such as a person, a threshold of a signal for determining a moving object (hereinafter, referred to as a "threshold") is set. In general, a threshold is configured through experiments or a threshold is configured on the basis of a probability model such as CFAR.

However, the size of the signal for movement differs between an adult and a child, and the size of the signal also differs due to the clothes people wear depending on the season, such as summer or winter. Therefore, there is a problem that the conventional method is not applied when various environments and the distribution of received signals are not correlated with the existing probability model.

Therefore, there is a problem that it is impossible to accurately detect an object in various environments described above with the threshold, which is determined using experiments or a probability model as in the related art.

DISCLOSURE

Technical Problem

Accordingly, the present disclosure has been made keeping in mind the above problems occurring in the related art, and the present disclosure is intended to propose a method of adaptively configuring a threshold of a signal for determining a moving object according to a detected environment.

Technical Solution

In order to accomplish the above object, according to an embodiment of the present disclosure, the present disclosure provides a device for adaptively configuring a threshold for moving object detection by means of radar, the device including: a position-specific maximum signal value extraction unit extracting a maximum value of a signal for each predetermined position by obtaining the signal when there is no moving object in a detection space; a position-specific signal magnitude sorting unit obtaining signals caused by a moving object for a predetermined time, and sorting magnitudes of the obtained signals for each the position in descending order with respect to a time index; a candidate signal index selection unit selecting, among the sorted signals by using a variation of a slope of the sorted signals, a candidate signal index for configuring the threshold; a signal index determination unit setting weighting factors for the respective signals up to the candidate signal index, and determining a sum of the set weighting factors as a signal index for configuring the threshold; and a position-specific threshold configuring unit configuring the threshold for each the position by using a signal of the determined signal index and a predetermined scaling factor.

In order to accomplish the above object, according to an embodiment of the present disclosure, the present disclosure provides a method of adaptively configuring a threshold for moving object detection by means of radar, wherein the method is performed by an adaptive threshold configuration device, the method including: (a) extracting a maximum value of a signal for each determined position by obtaining the signal when there is no moving object in a detection space; (b) obtaining signals caused by a moving object for a predetermined time, and sorting magnitudes of the obtained signals for each the position in descending order with respect to a time index; (c) selecting, among the sorted signals by using a variation of a slope of the sorted signals, a candidate signal index for configuring the threshold; (d) setting weighting factors for the respective signals up to the candidate signal index, and determining a sum of the set weighting factors as a signal index for configuring the threshold; and (e) configuring the threshold for each the position by using a signal of the determined signal index and a predetermined scaling factor.

Advantageous Effects

According to an embodiment of the present disclosure, a threshold of a signal for determining a moving object is adaptively configured depending on a detected environment.

Also, the accuracy in detecting a moving object is enhanced even in various environments.

It should be understood that the effects of the present disclosure are not particularly limited to those described above, and the present disclosure includes all effects that can be deduced from the detailed description of the disclosure or the configurations of the disclosure described in the appended claims.

DESCRIPTION OF DRAWINGS

FIG. 1 is a diagram illustrating a configuration of a system for adaptively configuring a threshold for object detection by means of radar according to an embodiment of the present disclosure.

FIG. 2 is a block diagram illustrating a configuration of an adaptive threshold configuration device according to an embodiment of the present disclosure.

FIGS. 3 to 8 are diagrams illustrating operations of each element of an adaptive threshold configuration device.

FIG. 9 is a flowchart illustrating a process of adaptively configuring a threshold according to an embodiment of the present disclosure.

MODE FOR DISCLOSURE

A variety of modifications may be made to the present disclosure and there are various embodiments of the present disclosure, examples of which will now be provided with reference to drawings and described in detail. However, the present disclosure is not limited thereto, and the exemplary embodiments can be construed as including all modifications, equivalents, or substitutes in a technical concept and a technical scope of the present disclosure. The similar reference numerals refer to the similar elements described in the drawings.

Hereinafter, exemplary embodiments of the present disclosure will be described in detail with reference to the accompanying drawings.

FIG. 1 is a diagram illustrating a configuration of a system for adaptively configuring a threshold for object detection by means of radar according to an embodiment of the present disclosure.

The system for adaptively configuring a threshold for object detection by means of radar according to the embodiment of the present disclosure may include a radar 10 and an adaptive threshold configuration device 100.

For reference, a "threshold" used below means a threshold that is a criterion for determining a measurement target as a moving object at each position in a detection space (place) for measurement using the radar 10.

In the present disclosure, regarding the radar 10, an impulse-radio ultra-wide band (IR-UWB) radar may be used as an example. It is noted that the radar 10 of the present disclosure is not limited to IR-UWB radar and various radars may be used according to embodiments.

In the meantime, in order to adaptively configure a threshold, the adaptive threshold configuration device 100 extracts the maximum value of the signal for each position when there is no moving object in a detection space (place), collects signals caused by a moving object for a predetermined time, and sorts the magnitudes of the signals for each position in descending order.

Afterward, the adaptive threshold configuration device 100 obtains, for each position, a ratio between the maximum value of the signal measured when there is no moving object and each of the values of the signals that are measured when there is a moving object and sorted in descending order.

Afterward, the adaptive threshold configuration device 100 obtains a slope for each of the ratio values and selects a point in time (an index in a time axis) at which the variation of the slope sharply decreases as a candidate signal index (hereinafter, referred to as a "candidate signal index") for configuring the threshold, and separates a signal in which a moving object is detected and noise on the basis of the selected candidate signal index.

Afterward, the adaptive threshold configuration device 100 determines a final signal index (hereinafter, referred to as a "signal index") for configuring the threshold through a local maximum checking method with respect to signals up to the candidate signal index and adaptively configures the threshold for each position by using the signal of the finally determined signal index and a scaling factor.

Hereinafter, a configuration of an adaptive threshold configuration device 100 will be described in detail with reference to FIG. 2.

FIG. 2 is a block diagram illustrating a configuration of an adaptive threshold configuration device 100 according to an embodiment of the present disclosure. FIGS. 3 to 8 are diagrams illustrating operations of each element of an adaptive threshold configuration device 100.

The adaptive threshold configuration device 100 according to the embodiment of the present disclosure may include a position-specific maximum signal value extraction unit 110, a position-specific signal magnitude sorting unit 120, a candidate signal index selection unit 130, a signal index determination unit 140, a position-specific threshold configuring unit 150, a control unit 160, and a storage unit 170.

Describing each element, the position-specific maximum signal value extraction unit 110 may extract the maximum value of the signal for each predetermined position when there is no moving object in the detection space (place).

FIG. 3 shows that the position-specific maximum signal value extraction unit 110 extracts the maximum value of the signal for each position.

In FIG. 3, the fast time axis represents a signal continuously measured by the radar 10, and the signal on the fast time axis may be received early or late depending on the position (distance) of the object.

Therefore, regarding the fast time axis, as a detectable distance of the radar 10, each predetermined position of the detection space (pace) may be represented on the fast time axis.

The slow time axis may represent time and a period in which the radar 10 operates in the detection space (place). For example, an object may be detected at intervals of 0.1 seconds for 10 minutes.

Hereinafter, depending on case, the fast time axis is referred to as a "distance axis" and the slow time axis is referred to as a "time axis".

When the index of the fast time axis is N and the index of the slow time axis is M, the position-specific maximum signal value extraction unit 110 may extract the maximum value of the signal for each position as shown in [Equation 1] below.

$$W_1 = \max([r_{11}, r_{21}, r_{31}, \ldots, r_{M1}])$$

$$W_2 = \max([r_{12}, r_{22}, r_{32}, \ldots, r_{M2}])$$

$$\ldots$$

$$W_N = \max([r_{1N}, r_{2N}, r_{3N}, \ldots, r_{MN}])$$

$$W = [W_1, W_2, W_3, \ldots, W_N] \quad \text{[Equation 1]}$$

In the meantime, the position-specific signal magnitude sorting unit 120 may obtain signals caused by a moving object for a predetermined time and sort the magnitudes of the signals for each position in descending order with respect to the time index.

FIG. 4 shows that the position-specific signal magnitude sorting unit 120 sorts the magnitudes of the signals for each position in descending order with respect to the time index.

The result (V) of sorting the magnitudes of the signals for each position in descending order with respect to the time index is represented by the following Equation.

$$V_N = \text{sort}(r_N) \qquad \text{[Equation 2]}$$

In the meantime, the candidate signal index selection unit 130 may select a candidate signal index for configuring the threshold among the signals sorted in descending order.

To this end, the candidate signal index selection unit 130 may obtain, for each position, the ratio between the maximum value of the signal measured when there is no moving object and each of the values of the signals that are measured when there is a moving object and sorted in descending order and separate a signal in which the moving object is detected and noise on the basis of a point in time (the candidate signal index) at which the variation of the slope for the ratio sharply decreases.

FIG. 5 shows that the candidate signal index selection unit 130 separates a threshold candidate signal index and the noise.

Specifically, the ratio ($\alpha i, j$) for each position between the maximum value ($W_i$) of the signal measured when there is no moving object and each of the values ($V_{i,j}$) of the signals that are measured when there is a moving object and sorted in descending order, may be represented by the following Equation.

$$\alpha_{i,j} = V_{i,j}/W_i (i=1,2,3, \ldots N, j=1,2,3, \ldots M) \qquad \text{[Equation 3]}$$

Afterward, the candidate signal index selection unit 130 may obtain the slope for each calculated ratio $\alpha i$ and select the index at the point in time where the variation of the slope sharply decreases as a candidate signal index (k).

Here, the point in time where a sharp decrease occurs may be determined using a predetermined reference value of the variation of the slope.

That is, when the slope sharply decreases from the candidate signal index k, signals up to the candidate signal index k are designated as candidate signals for configuring the threshold and signals from the candidate signal index k+1 through the candidate signal index M are determined as noise.

In the meantime, the signal index determination unit 140 sets weighting factors for the signals up to the candidate signal index k through the local maximum checking method.

Here, the local maximum checking method is determined with respect to the time axis and the distance axis. The signal index determination unit 140 sets, when each of the signals up to the candidate signal index k is the local maximum with respect to both the time axis and the distance axis, the weighting factor of one to the corresponding signals.

When being the local maximum with respect to only the time axis, the signal index determination unit 140 sets the weighting factor of a predetermined value (R) smaller than one to the corresponding signal.

Further, when not being the local maximum with respect to both the time axis and the distance axis, the signal index determination unit 140 sets the weighting factor of zero to the corresponding signal and also sets the value of the signal to zero.

FIG. 6 shows that the signal index determination unit 140 sets a weighting factor to each of the candidate signals among the signals sorted on the time axis, by using the local maximum checking method.

Further, the signal index determination unit 140 determines, as the final signal index, a value obtained by applying, when the sum of the set weighting factors has the decimal point, rounding up (ceil) to a value following the decimal point, which is represented by the following Equation.

$$g = \text{ceil}\left(\sum_1^k \text{weighting factor}\right) \qquad \text{[Equation 4]}$$

FIG. 7 shows that the signal index determination unit 140 finally determines the signal index.

For reference, in FIG. 7, the signal to which the weighting factor of zero is set by the local maximum method is excluded from the candidate signals when performing re-sorting, which is represented by the following Equation.

$$V_P = \text{sort}(r_p) \qquad \text{[Equation 5]}$$

Here, p is the number of positions at which a moving object is detected.

In the meantime, the position-specific threshold configuring unit 150 configures the threshold for each position by using the signal corresponding to the determined signal index and a predetermined scaling factor, which is represented by the following Equation.

$$T_i = \gamma * V_g \qquad \text{[Equation 6]}$$

Here, $\gamma$ denotes the scaling factor; $V_g$ denotes the signal of the determined threshold signal index; and $T_i$ denotes the threshold at the i-th position.

FIG. 8 shows that the position-specific threshold configuring unit 150 configures the threshold at a particular position.

The determined threshold signal index and the signal of the corresponding index are represented.

That is, at the position shown in FIG. 8, the threshold $T_i$ is adaptively configured. At the position, when the magnitude of the signal is larger than $T_i$, it is detected that the signal relates to a moving object. When the magnitude is smaller than $T_i$, it is determined that the signal is noise rather than a moving object.

In the meantime, the control unit 160 controls the elements of the adaptive threshold configuration device 100, for example, the position-specific maximum signal value extraction unit 110, the position-specific signal magnitude sorting unit 120, the candidate signal index selection unit 130, the signal index determination unit 140, and the position-specific threshold configuring unit 150 in such a manner as to perform the respective operations described above for adaptive threshold configuring, and also controls the storage unit 170.

In the meantime, the storage unit 170 stores an algorithm for the control unit 160 to control the elements of the adaptive threshold configuration device 100, and various types of data required for or derived from the control process according to the algorithm.

FIG. 9 is a flowchart illustrating a process of adaptively configuring a threshold according to an embodiment of the present disclosure.

The process shown in FIG. 9 is performed by the adaptive threshold configuration device 100.

First, the adaptive threshold configuration device 100 extracts the maximum value of the signal for each position when there is no moving object in the measurement space (place) at step S901.

After step S901, the adaptive threshold configuration device 100 collects signals caused by the moving object for a predetermined time and sorts, for each position, the magnitudes of the signals in descending order with respect to the signal index at step S902.

After step S902, the adaptive threshold configuration device 100 obtains, for each position, a ratio between the maximum value of the signal measured when there is no moving object and each of the values of the signals that are measured when there is a moving object and sorted in descending order at step S903.

After step S903, the adaptive threshold configuration device 100 obtains the slope for each of the ratio values; selects a point in time at which the variation of the slope sharply decreases as the candidate signal index; and separates a signal in which the moving object is detected and the noise on the basis of the selected candidate signal index at step S904.

After step S904, the adaptive threshold configuration device 100 sets the weighting factors to the respective signals up to the candidate signal index through the local maximum checking method at step S905.

Here, when being the local maximum with respect to both the time axis and the distance axis, the weighting factor is set to one; when being the local maximum with respect to only the time axis, the weighting factor is set to a predetermined value smaller than one; and when not being the local maximum with respect to both the time axis and the distance axis, the weighting factor is set to zero.

For reference, regarding the candidate signal index in which the weighting factor is set to zero, the value of the signal is set to zero.

After step S905, the adaptive threshold configuration device 100 determines the value obtained by applying rounding up to the sum of the weighting factors, as the final signal index at step S906.

After step S906, the adaptive threshold configuration device 100 adaptively configure the threshold for each position by using the signal of the determined signal index and the scaling factor at step S907.

The technical details described above may be embodied as program commands executable by various computer means and may be recorded on a computer-readable recording medium.

The computer-readable recording medium may include program commands, data files, data structures, and the like separately or in combinations.

The program commands to be recorded on the computer-readable recording medium may be specially designed and configured for embodiments of the present disclosure or may be well-known to and be usable by those skilled in the art of computer software.

Examples of the computer-readable recording medium include magnetic recording media such as hard disks, floppy disks and magnetic tapes; optical data storage media such as CD-ROMs or DVD-ROMs; magneto-optical media such as floptical disks; and hardware devices, such as read-only memory (ROM), random-access memory (RAM), and flash memory, which are particularly structured to store and implement the program instruction.

Examples of the program instructions include not only a mechanical language code formatted by a compiler but also a high level language code that may be implemented by a computer using an interpreter, and the like.

The hardware equipment may be configured to be operated as one or more software modules for executing the operations of the exemplary embodiments of the present disclosure, and vice versa.

Although the disclosure is described with reference to specific items such as specific structural elements, to merely some embodiments, and to drawings, such specific details disclosed herein are only representative for purposes of helping more comprehensive understanding of the present disclosure. The present disclosure, however, is not limited to only the example embodiments set forth herein, and those skilled in the art will appreciate that the present disclosure can be embodied in many alternate forms.

Accordingly, the present disclosure is intended to cover not only the exemplary embodiments, but also various alternatives, modifications, equivalents and other embodiments that may be included within the spirit and scope of the present disclosure as defined by the appended claims.

The invention claimed is:

1. A device for adaptively configuring a threshold for moving object detection by means of radar, the device being configured to:
   extract a maximum value among signals for each of a plurality of predetermined positions by obtaining the signals when there is no moving object in a detection space;
   obtain signals caused by a moving object for a predetermined time, and sorting several magnitudes for each signal obtained for each position in descending order with respect to a time index;
   select, among the sorted signals by using value of a variation of a slope of the sorted signals, a candidate signal index for configuring the threshold;
   set weighting factors for the respective signals up to the candidate signal index, and determine a sum of the set weighting factors as a signal index for configuring the threshold; and
   configure the threshold for each position by using a signal of the determined signal index and a scaling factor.

2. The device of claim 1, wherein the device sets the weighting factors using a local maximum checking method,
   when being a local maximum with respect to both a time axis and a distance axis, the weighting factor is set to one,
   when being the local maximum with respect to only the time axis, the weighting factor is set to a predetermined value smaller than one,
   when not being the local maximum with respect to both the time axis and the distance axis, the weighting factor is set to zero, and
   a value of the signal of the candidate signal index in which the weighting factor is set to zero is set to zero.

3. The device of claim 2, wherein the device performs re-sorting for the candidate signal index by applying the candidate signal index in which the value of the signal is set to zero.

4. The device of claim 2, wherein the device applies, when the sum of the weighting factors has a decimal point, rounding up (ceil) to a value following the decimal point.

5. The device of claim 1, wherein the device separates a signal in which the moving object is detected and a noise signal on the basis of the selected candidate signal index.

6. The device of claim 1, wherein the device calculates, for each position, a ratio between the extracted maximum value among the signals and each value of the magnitudes of the signals sorted in descending order, and selects, as the candidate signal index, an index of the signal corresponding to a point in time at which the value of the variation of the slope for each of the calculated ratios is larger than a predetermined reference value.

7. A method of adaptively configuring a threshold for moving object detection by means of radar, wherein the method is performed by an adaptive threshold configuration device, the method comprising:
(a) extracting a maximum value among signals for each position determined by obtaining the signals when there is no moving object in a detection space;
(b) obtaining signals caused by a moving object for a predetermined time, and sorting several magnitudes for each signal obtained for each position in descending order with respect to a time index;
(c) selecting, among the sorted signals by using a value of a variation of a slope of the sorted signals, a candidate signal index for configuring the threshold;
(d) setting weighting factors for the respective signals up to the candidate signal index, and determining a sum of the set weighting factors as a signal index for configuring the threshold; and
(e) configuring the threshold for each the position by using a signal of the determined signal index and a scaling factor.

8. The method of claim 7, wherein at the step (d), the weighting factors are set using a local maximum checking method,
when being a local maximum with respect to both a time axis and a distance axis, the weighting factor is set to one,
when being the local maximum with respect to only the time axis, the weighting factor is set to a predetermined value smaller than one,
when not being the local maximum with respect to both the time axis and the distance axis, the weighting factor is set to zero, and
a value of the candidate signal index in which the weighting factor is set to zero.

9. The method of claim 8, wherein at the step (d), re-sorting is performed for the candidate signal index by applying the candidate signal index in which the value of the signal is set to zero.

10. The method of claim 7, wherein at the step (c), a signal in which the moving object is detected and a noise signal are separated from each other on the basis of the selected candidate signal index.

11. The method of claim 7, wherein at the step (c), a ratio between the extracted maximum value of the signal and each value of the magnitudes of the signals sorted in descending order is calculated for each position, and an index of the signal corresponding to a point in time at which the value of the variation of the slope for each of the calculated ratios is larger than a predetermined reference value is set as the candidate signal index.

12. A computer program stored on a non-transitory recording medium, wherein the computer program includes a series of instructions for performing the method according to claim 7.

* * * * *